United States Patent [19]

Howe

[11] Patent Number: 4,748,757

[45] Date of Patent: Jun. 7, 1988

[54] ANIMAL IDENTIFICATION TAG

[75] Inventor: Steve R. Howe, Glendale, Ariz.

[73] Assignee: An-Tech International Livestock Products, Phoenix, Ariz.

[21] Appl. No.: 20,714

[22] Filed: Mar. 2, 1987

[51] Int. Cl.⁴ .............................................. G09F 3/00
[52] U.S. Cl. ...................................................... 40/301
[58] Field of Search ........................ 40/300, 301, 302; 119/156

[56] References Cited

U.S. PATENT DOCUMENTS

| Re. 31,940 | 7/1985 | Ritchey | 40/301 |
| 4,021,952 | 5/1977 | Brierley | 40/301 |
| 4,209,924 | 7/1980 | Fearing | 40/301 |
| 4,597,208 | 7/1986 | Chevillot | 40/301 |
| 4,646,455 | 3/1987 | Gardner | 40/301 |

FOREIGN PATENT DOCUMENTS 0123506 10/1984 European Pat. Off. ............. 40/301
2128938 5/1984 United Kingdom ................. 40/301

Primary Examiner—Robert P. Swiatek
Assistant Examiner—Michael Lynch
Attorney, Agent, or Firm—Joseph H. Roediger; Gregory Nelson

[57] ABSTRACT

An animal identification tag of improved flexibility wherein the connection between shaft and tab is characterized by concentric ridges and depressions in a circumferential region having reduced thickness.

11 Claims, 1 Drawing Sheet

ANIMAL IDENTIFICATION TAG

BACKGROUND OF THE INVENTION

Identification tags have been used for numerous types of animals throughout the years. The original metal clips pressed onto the ear of an animal have been replaced with more sophisticated combinations of pins which pierce a portion of the body of an animal and a tag which is affixed thereto. The tag, typically formed of a soft plastic, is provided with an indicia receiving surface connected by a socket located on the outside of the tag near one end thereof. A hole extends through the tag into the socket and a shoulder is contained therein to receive a piercing head contained on a shaft of reduced diameter.

A mechanical applicator, similar in many respects to a pair of pliers, is typically utilized to urge the piercing head through the body portion of the animal and through the hole in the large area tag. Frequently, the body piercing head is attached to a shaft which itself is mounted on a smaller indicia receiving tag. The application grips both of the panels forming parts of the tags and in a preferred manner, automatically ejects the joined elements promptly upon the completion of the piercing operation. One applicator found especially well-suited for use with the present invention is described in co-pending U.S. application Ser. No. 638,983, filed in the name of Howe, et al. This patent application contains an extensive discussion of prior art applicators and tags.

As the extensive prior art discusses, the creation of an untended wound in a body portion of an animal provides an opportunity for later infection, irritation or expansion of the wound surface by the application of force to the installed tag. Among the steps taken in the design of tags to promote recovery by the animal from this infliction of a wound are the location of fastening parts on the sides of the tags remote from the animal so that the wound encounters only smooth surfaces and also the use of a ribbed structure which provides radial air channels to promote healing. In the latter design, it is intended to provide opportunity for air-flow to occur between the base of the shaft, or stem, extending through the body portion of the animal and the environment. Also, the use of softer more flexible materials for tags and securing devices is recognized as reducing the irritation or tearing of the wound due to forces being applied to the affixed tags. However, the structure cannot be made highly flexible since forces have to be transmitted from the applicating device along a shaft to the body piercing head and the use of highly flexible materials results in a deformation taking place during the piercing operation. As a result, there is apt to be misalignment of the piercing head with the securing device thereby creating a much larger wound than necessary.

Accordingly, it is an object of the present invention to provide an animal identification tag containing a body piercing member which is designed to provide improved rotation between the indicia displaying panel and the shaft containing the piercing head. In addition, the present invention is directed to the provision of a tag formed of synthetic flexible material in an integral unitary design. A further object is to provide the foregoing benefits in a structural configuration compatible with commercially available applicating devices.

SUMMARY OF THE INVENTION

This invention relates to an animal identification tag for use in combination with a conventional securing device containing a socket, said socket receiving an animal piercing means and securing same in a movably fixed position. The identification tag includes a planar indicia-displaying member of relatively large area having first and second opposing surfaces. A stem with first and second ends and a longitudinal axis extending therebetween has its second end affixed to the first surface of the planar member. The axis of the stem is substantially perpendicular to the first surface. A piercing means adapted to pass through the appropriate body portion of the animal is affixed to the first end of the stem. When suitable force is applied to the piercing means, it travels through said body portion into a receiving socket. The planar member is provided with a region of reduced thickness spaced from the second end of the stem and disposed circumferentially thereabout. The region is capable of deformation when relatively small forces are applied to the planar member so as permit movement of the stem so that the longitudinal axis thereof can be moved from the substantially perpendicular rest position. As a result, the likelihood of damage being inflicted on the animal as a result of snagging of the planar member on adjacent objects, is substantially reduced. By increasing the sensitivity of the planar member to outside forces, irritation of a fresh wound or expansion of the wound surface is less likely with the result that animal health is not likely to have suffered because of the planar member being caught on fences, trees and the like, or other animals. Further features and advantages of the invention will become more readily apparent from the following description of a preferred embodiment when taken in conjunction with the accompanying drawings.

DESCRIPTION OF THE PREFERRED EMBODIMENT

Figures 1, 2, 3, 4, 5, 6, 7:
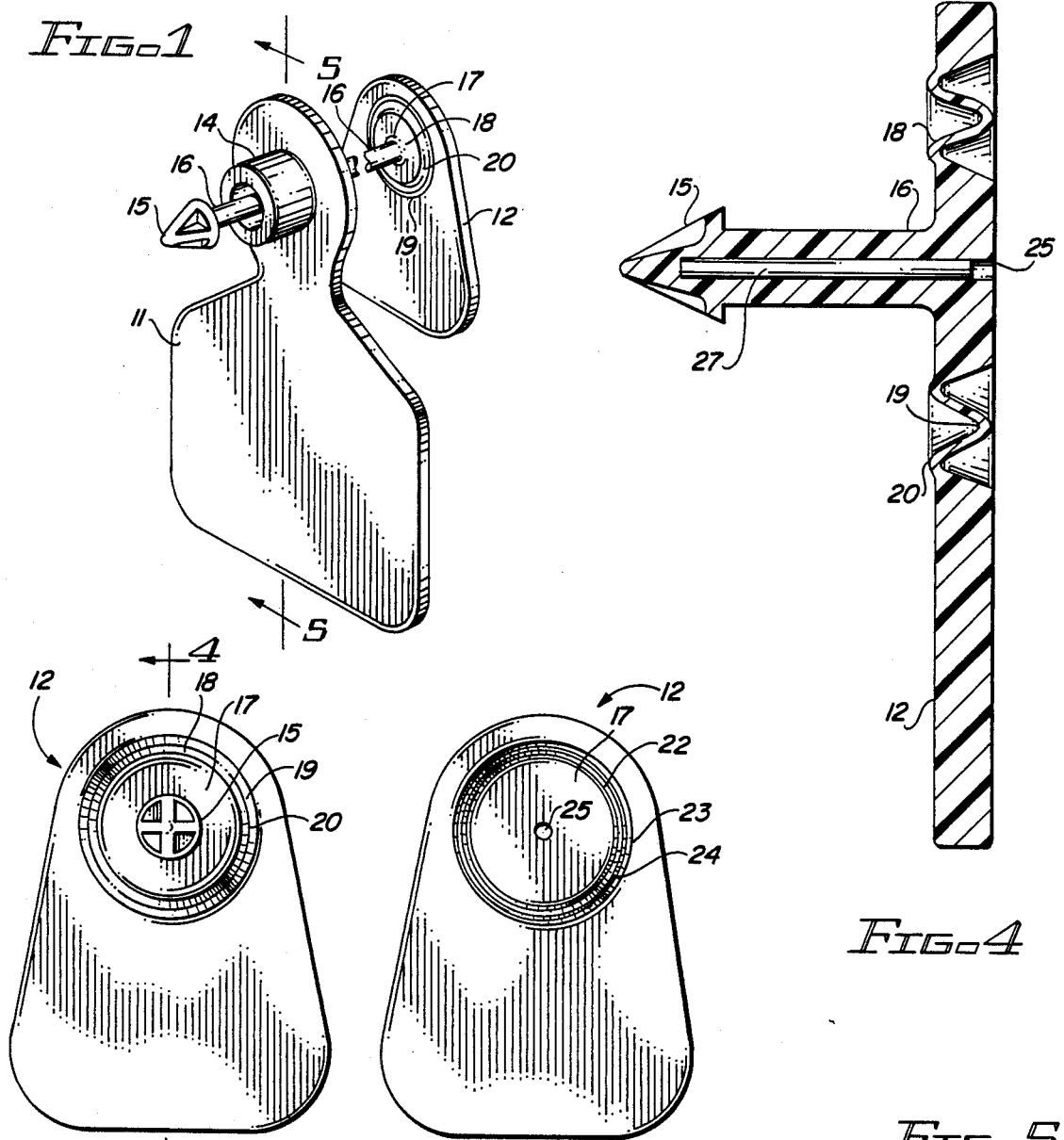
FIG. 1 is a perspective view of a preferred embodiment of the invention.
FIGS. 2 and 3 are plan views showing the front and back surfaces of the attachment device of the embodiment shown in FIG. 1.
FIG. 4 is a cross-sectional view taken along line 4—4 of FIG. 2.
FIG. 5 is a cross-sectional view taken along line 5—5 of FIG. 1.
FIG. 6 is a front plan view of another embodiment of the invention.
FIG. 7 is a pin member for use in connection with the embodiment of FIG. 1.

Referring now to FIG. 1, a conventional large area front indicia-display panel 11 is shown in combination with the attachment device 12 which is the subject of the present invention. The attachment device 12 is designed to permit penetration of the body portions of a cow, sheep or pig, typically through the ear. The relative size of the display panel on either side of the pierced body portion of the animal may be altered as desired and, in connection with sheep and other small animals, the frontal panel 11 may be replaced by a small area receiving socket. The design of a suitable front panel for use with the present invention is described in the co-pending U.S. patent application Ser. No. 638,983 to Howe, et al. In use, the frontal panel includes receiving socket 14 which is a cylindrical member affixed to the body of panel 11 about a hole of narrower diameter formed in the panel. Thus, the conventional retaining well is defined by the panel and cylindrical member. The piercing head 15 of shaft 16 is retained on the far side of the panel 11 by the well so as to be spaced from the surface of the pierced animal body portion. One applicator device found particularly useful for the piercing of animal body portions is described in co-pending U.S. patent application Ser. No. 638,983.

The small area planar panel 12 is adapted to receive information thereon and, as noted above, may well be the only display surface provided for small animals. The shaft 16 having the piercing head 15 on one end thereof is attached at its base 17 to the planar panel 12.

As shown, a pair of spaced concentric ridges 18 and 19 extend circumferentially about the base 17 of the shaft. Intermediate these ridges is a trough 20, again extending circumferentially about the base of the shaft. As will later be described, the placement of flexible coupling means, formed by the combination of ridges and trough, enable the generally perpendicular shaft 16 to be tilted in relation to the surface of planar member 12. When the piercing head 15 is urged through the body portion of the animal, a wound is caused which provides access to the internal systems of the animal. It has long been recognized that the area of the wound benefits from the circulation of air thereabout to promote effective healing in a reasonable period of time. Thus, the need for loose coupling between the securing device, whether it be on the frontal panel or by itself, and the rear portion of the animal identification tag to which the shaft containing the piercing head is fixed be spaced apart so that air can be circulated into and around the area of the wound.

As tags are used on animals that are free to move about, either in the open environment or in a pen or enclosure wherein a multitude of other animals are present, the tag is apt to be snagged or deflected as the animal passes another object. This tends to cause the wound to re-open, or in extreme cases of snagging, to cause a tearing of the pierced body portion and the creation of new wounds with an additional source of infection. The reduction of the undesirable effects from snagging of identification tags has long been recognized to be a desirable goal.

In the preferred embodiment of FIG. 1, the rear or small identification tag containing the shaft and piercing head are formed as an integral unit of a flexible plastic material. This permits the larger area panel to be deflected and bent upon encountering another object. However, the requirement that the shaft 16 be sufficiently rigid to permit the application of force to the piercing head 15 without causing buckling and unnecessary trauma to the animal has generally required the use of a stiff plastic. In one attempt to create a more flexible tag and piercing element, the applicator employs a steel piercing end which extends upwardly along the shaft through the head 15 to strike the animal directly. The apparatus and associated pin are withdrawn after the animal has been disturbed so that for a definite period, the animal is inextricably linked to the applicator device thereby promoting a tearing of the wound as the animal is frightened and in a tense state. This type of applicator and its limitations have resulted in the development of at least one other applicator which fires the piercing head 15 on the shaft through the body portion of the animal and does not require a direct connection between the piercing means and the applicator after the act of piercing has taken place.

In the system wherein a uniform piercing head is used and the quick release simultaneously causes the applicator to be removed from the direct connection with the animal, additional force is imparted to the head through the shaft 16. Thus, the product designer has been required to limit flexibility in turn to obtain strong piercing capability. The resultant product has been a semi-rigid shaft which can readily tear the wound when the associated tag is snagged by an adjacent object. The combination of radially-spaced and circumferentially-located ridges and trough permit the axis of the shaft to rotate from its normally perpendicular position with relation to the plane of the small area panel 12.

The constructional features are more readily noted from other Figs., wherein FIG. 2 and FIG. 3 show the panel 12 in front and rear plan views respectively. The piercing head 15 is noted to have four strenghtening ribs which encounter the body portion being pierced. The basal region 17 has a greater area and can be noted extending outwardly from the base of the shaft beyond the edge of the piercing head. A ridge 18 defines the circumferential boundary of basal member 17 and outwardly therefrom is a trough 19 terminatng in elevating ridge 20. The opposite side of the panel 12 is shown in FIG. 3, wherein the underside of basal member 17 is bounded by a first depression 22 circumferentially extending thereabout. An adjacent elevated or ridged portion 24 corresponding to depression 19, noted from the top surface of the panel, extends therearound and is in turn bounded by a narrow depression 23 corresponding to the outermost ridge 20 on the top surface of panel 12. A centrally-located entry hole 25 is located in basal member 17 and receives a strengthening pin inserted therein to compensate for the use of a flexible plastic throughout the entire panel and assembly 12.

The particular constructional features of the cross-sectional view of FIG. 4, taken along line A—A of FIG. 2, show the integral unitary construction of panel 12 wherein the base member 17 from which shaft 16 extends upwardly to piercing head 15 has a diameter of two to three times that of the shaft 16. The use of the flexible plastic in a unitary element in the present invention has required greater consideration of the relationship between the support base for the shaft with the result that the base must extend outwardly in order to provide a uniform base for the application of force during the body piercing operation.

The circumferential ridge 18 is shown extending about the base member 17 and it is formed of reduced thickness compared to the thickness of the base member. Adjacent the ridge 18 is a trough 19 bounded by an additional ridge 20 at its outermost periphery. The three elements are all characterized by being formed of the reduced thickness of material. The thickness of the element returns to that of base member 17 at the transition from ridge 20 to the outer regions of panel 12. In practice, the combination of reduced thickness elements and ridge-trough-ridge have been found to provide the shaft 16 with the ability to move from its generally perpendicular position so that the snagging of panel 12 on adjacent objects is markedly reduced. As a result, the likelihood of the wound being aggravated or a new body wound be caused by movement of the cow, or other animal, through its environment is also reduced. This results in a reduced veterinary cost for the operator and also decreases the market value of the animal. In the embodiment shown, the ratio of the thickness of the material in the ridge and trough region is one-fourth that of the base or panel members.

A strengthening pin 27 is shown contained longitudinally in shaft 16 and is emplaced prior to the body piercing operation through entry hole 25. Since the flexible plastic of shaft 16 requires a measure of rigidity so as to withstand the impact of the applied forces during piercing, the retention of the pin in the shaft is important to prevent the creation of a massive wound in the animal's ear. The pin 27 is frictionally retained in the shaft and, in the preferred embodiment, a pin having a longitudinal opening in one side to form a toothed pattern therein is utilized. The pin in combination with the surrounding flexible plastic of shaft 17 is made slightly oversized so as to be securedly retained during operation and subsequent usage. The pin, however, is utilized in the preferred embodiment, but it is to be noted that the present invention can be utilized with a solid shaft for certain applications if desired by the operator. In this type of embodiment, the entry hole 25 would not be present and strenghtening member 27 not utilized.

An additional embodiment for use with smaller animals such as sheep is shown in the plan view of FIG. 6 and is intended to be used in connection with a securing device similar to that shown in FIG. 5 but without the large area panel 11 extending therefrom. In both embodiments, an aperture is provided at the base of cylinder 14 for the rapid insertion of shaft 16 containing the strenghtening member 27 and retention therein by the fact that the piercing head 15, not shown in FIG. 5, extends laterally outward of the hole in panel 11. The narrow dimensions of the embodiment of FIG. 6 and, in particular, the width of display panel 30, render it difficult to form the circumferential combination of ridges and trough to extend about the entire periphery of the shaft upon which piercing head 35 is affixed. Thus, a pair of spaced ridges 32 and 33 with depression 34 formed therebetween are formed to extend laterally across the identification tag so as to provide enhanced movement of the panel 30 with relation to the shaft and piercing head. The combination of ridges and depression are formed on either side of the shaft so as to permit facile movement thereof. The preferred configuration for this embodiment utilizes reduced thickness regions for the formation of the ridges and depression as is the case with the previously discussed embodiment.

While the foregoing description has been with respect to specific embodiments of the invention, it is to be noted that many variations and modifications may be made therein without departing from the scope of the invention as claimed.

What is claimed is:

1. An animal identification tag for use with a securing device containing a socket to receive animal piercing means and securing same which comprises:
   (a) a planar indicia-displaying member having first and second opposing surfaces;
   (b) a shaft having first and second ends with a longitudinal axis extending therebetween, the second end of said shaft being affixed to the first surface of said planar member and aligned with said axis substantially perpendicular to said surface;
   (c) piercing means affixed to the first end of said shaft for passing through a body portion of an animal into said receiving socket; and
   (d) flexible coupling means formed in said planar member spaced from the second end of said shaft and disposed circumferentially thereabout, said means including a region of reduced thickness formed in said planar member proximate to the shaft thereby facilitating movement of said planar member in relation to said shaft.

2. The invention of claim 1 wherein said coupling means includes at least one ridge and depression formed in said planar member.

3. The invention of claim 2 wherein said ridge and depression extend circumferentially around and spaced from the second end of said shaft.

4. The invention of claim 3 wherein said shaft includes a longitudinal channel for receiving a strenghtening member therein.

5. The invention of claim 4 wherein said region has a thickness of one-fourth the thickness of adjacent portions of said planar member.

6. The invention of claim 5 further including first and second regions of reduced thickness spaced on opposing sides of the second end of said shaft.

7. The invention of claim 5 wherein said region of reduced thickness is circular with the second end of said shaft centrally located therein.

8. An attachment device for the affixation of an animal identification tag to the ear or similar body portion of an animal of the type wherein a receiving socket is located adjacent said body portion to receive the attachment device which comprises:
   (a) a stem having first and second ends with a longitudinal axis extending therebetween;
   (b) piercing means affixed to the first end of said stem for passing through a body portion of the animal into said receiving socket;
   (c) an indicia-receiving member having the second end of said stem coupled thereto, said member being aligned so that said stem axis is substantially perpendicular thereto; and
   (d) flexible coupling means contained in said member and spaced from the second end of said stem, said coupling means including at least one ridge and trough combination spaced adjacent the second end of said stem.

9. The invention in accordance with claim 8 wherein said ridge and trough combination are circumferentially disposed about the second end of the stem.

10. The invention in accordance with claim 9 wherein said coupling means includes a region of reduced thickness formed in said indicia-receiving member.

11. The invention in accordance with claim 10 further including a receiving socket for positioning adjacent said body portion and securedly receiving said piercing means.

* * * * *